March 24, 1925.

J. C. KECHTER

BEET PULLER

Filed June 3, 1924

Inventor
Joseph C. Kechter.
By A. J. O'Brien
Attorney

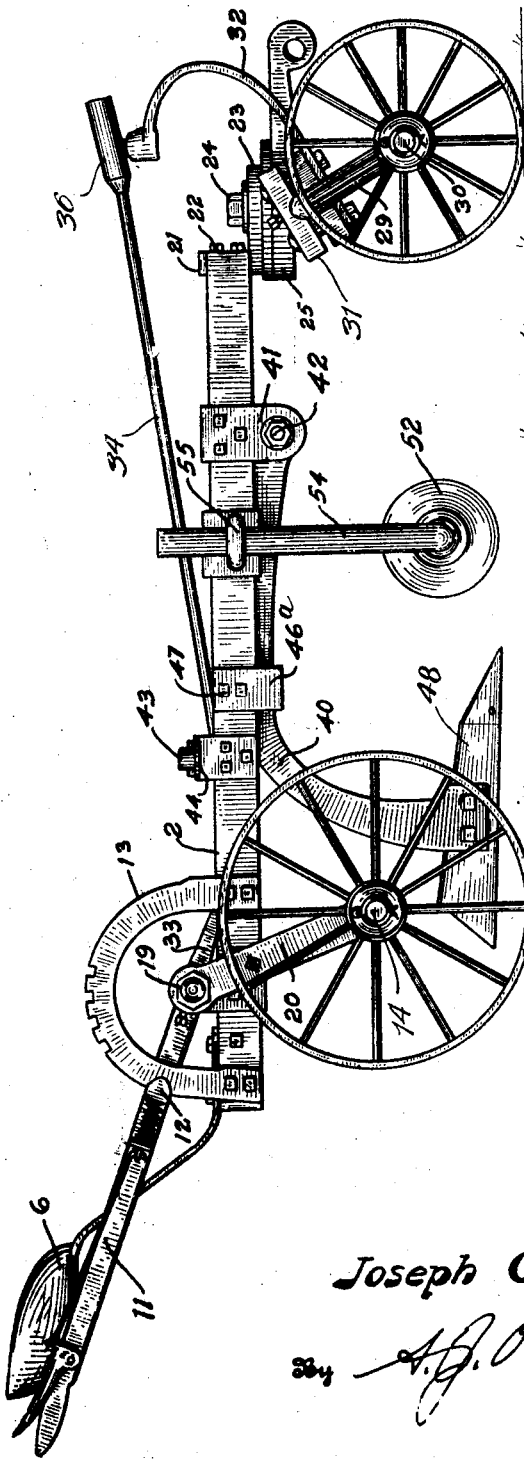

March 24, 1925. 1,530,497
J. C. KECHTER
BEET PULLER
Filed June 3, 1924 3 Sheets-Sheet 3
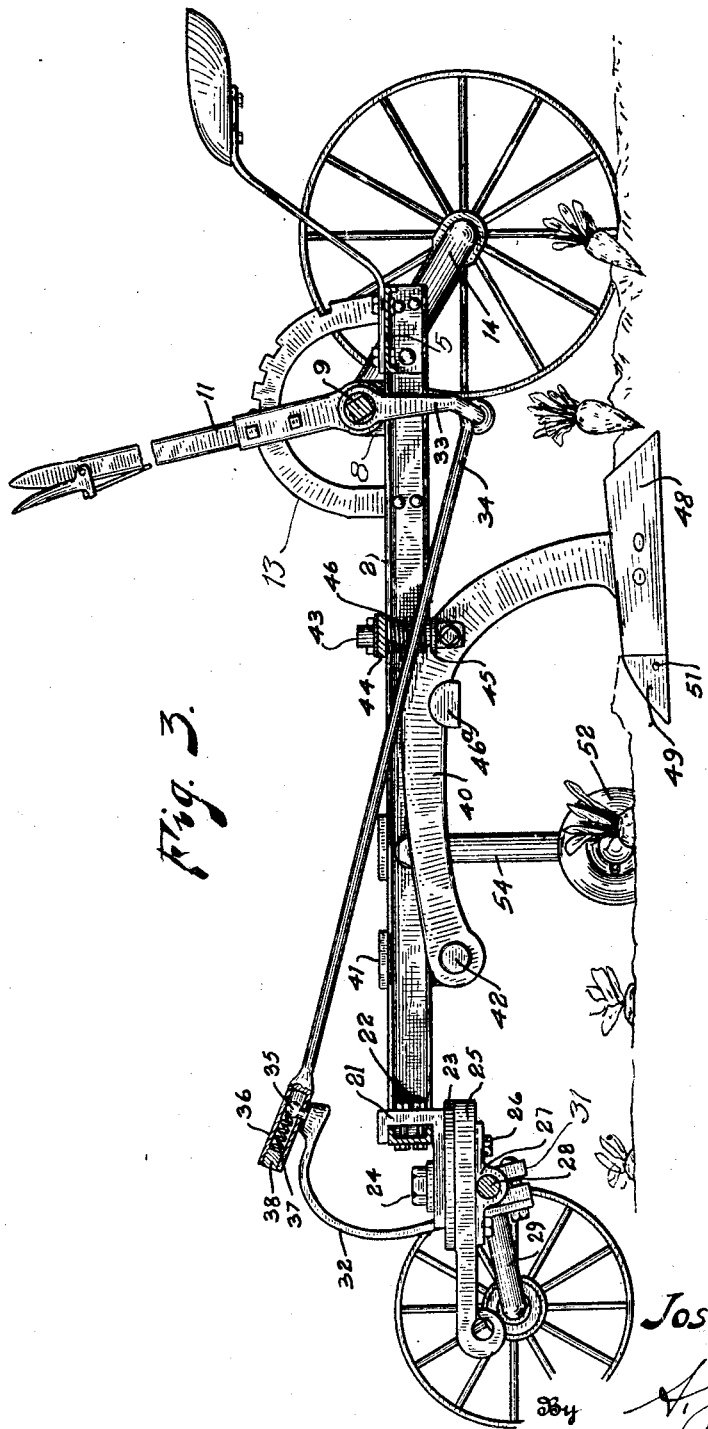
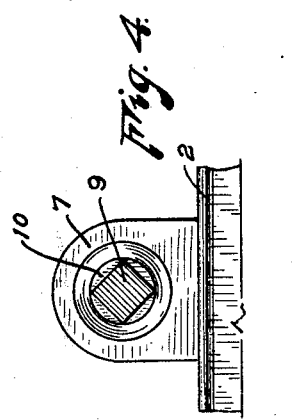
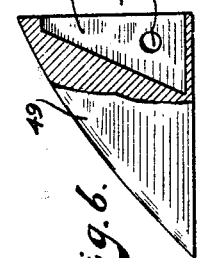
Inventor
Joseph C. Kechter.
By A. J. O'Brian
Attorney Patented Mar. 24, 1925.

1,530,497

UNITED STATES PATENT OFFICE.

JOSEPH CONRAD KECHTER, OF BOULDER, COLORADO.

BEET PULLER.

Application filed June 3, 1924. Serial No. 717,546.

*To all whom it may concern:*

Be it known that I, JOSEPH CONRAD KECHTER, a citizen of the United States, residing at Boulder, county of Boulder, and State of Colorado, have invented certain new and useful Improvements in Beet Pullers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in beet pullers.

In the harvesting of sugar beets, it is customary to loosen the beets by means of a horse-drawn implement known as a beet puller, which is provided with two spaced plows, spaced apart a short distance and adapted to straddle the beet rows and to loosen the beets.

I do not intend to give a résumé of the prior art or to point out the defects that exist, but shall confine myself to an explanation of my own invention which, briefly described, consists of a frame supported by four wheels,—two front and two rear wheels. Each pair of wheels is so mounted that they can readily be adjusted for the purpose of raising or lowering the frame with respect to the ground. To each side of the frame I have pivoted a plow beam carrying a plow. Spring means are provided for holding the plows in their lowermost position, in such a manner that they will yield in an upward direction. My machine is also provided with means for elevating both the front and the rear ends of the frame in unison and thereby maintain the plows at the same inclination with respect to the ground.

My invention and its advantages can be most clearly explained and will be most readily understood when reference is had to the accompanying drawings in which the preferred embodiment thereof is illustrated; and in which:

Fig. 2 is a side elevation thereof;

Fig. 3 is a section taken on line 3—3, Fig. 1;

Fig. 4 is a section taken on line 4—4, Fig. 1;

Fig. 5 is an end view of the replaceable plow point; and

Fig. 6 is a side view of the plow point, parts thereof being broken away to better disclose the construction.

Figure 1:
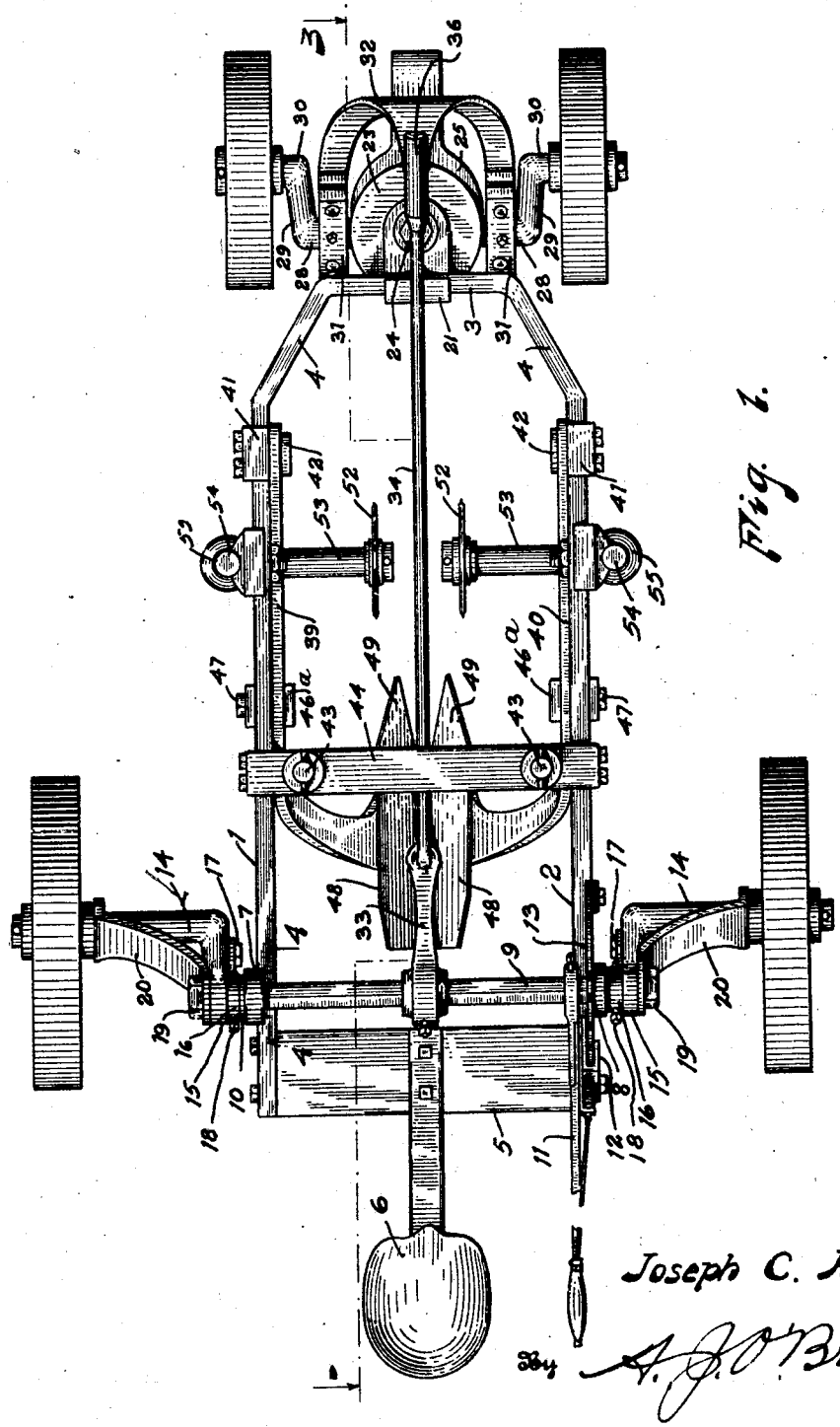
Fig. 1 is a top plan view of my improved beet puller.

The puller has a frame preferably formed from a channel iron bent into what may be loosely termed U-shape. The sides 1 and 2 are parallel and are joined to the transverse front piece 3 by inclined portions 4. The rear ends of the frame are connected by a channel or a flat bar 5 to which the seat 6 is attached. Directly in front of the bar 5, I secure to the sides 1 and 2 bracket members 7 and 8, which serve as bearings for the transverse non-circular shaft 9 which projects through openings in these brackets and extends a short distance beyond them. Since the openings in the brackets are round and the shaft square, or of any other non-circular cross-section, I provide bushings 10 provided with properly shaped openings to receive the shaft and having its outer surface cylindrical so as to be freely rotatable in the brackets. A handle or lever is connected to the shaft 9 and is provided with a detent 12 that cooperates with a quadrant 13. By means of this lever, the shaft can be rotated to any extent required and held in this position. Secured to the ends of the shaft 9 are brackets 14 on the ends of which the rear wheels are journaled. The brackets 14 have two portions bent at right angles to each other, one of these serving as the journal or axle for the wheels, while the other end, which has been designated by numeral 15, is flattened and perforated for the reception of the shaft 9. A collar 16 is secured to the bracket 14 by means of a bolt 17 and has a set screw 18, by means of which it can be clamped onto the shaft 9. Nuts 19 serve to force the flattened portion 15 of the bracket against the collar 16. A bar 20 extends diagonally across the bracket 14 and serves as a brace and as an abutment for the inner end of the wheel hub.

It is evident from the above, and from an inspection of the drawing that the distance from the bottom of the frame to the ground can be changed by rotating the shaft 9 on its axis, which can be accomplished by means of the lever 11. Since it is one object of my invention to produce a beet puller in which the front and rear ends of the supporting frame are simultaneously raised and lowered a like distance, it is, of course essential that the front wheels shall also be secured to the frame by means which permit the height of the frame to be adjusted and which will now be described.

Secured to the front end of the frame is a turntable comprising a vertical portion 21 which is secured to the frame by means of bolts 22. The horizontal circular portion 23 is centrally perforated for the reception of a king bolt 24, by means of which the lower member 25 is pivotally attached to member 23. Secured to member 25 by bolts 26 or other suitable equivalent means, is a bearing 27 (Fig. 3) through which the front axle 28 passes, and in which it is rotatable. The shape of the front axle can best be seen in Fig. 1. It comprises a central straight portion 28 which is connected by arms 29 to the axle portions 30 on which the front wheels are journaled. Secured to the part 28 on each side of member 25 are clamps 31 to which is fastened a curved lever 32. Secured to shaft 9 is a lever 33 to the end of which is secured a rod 34. This rod extends to the front of the machine where it is connected to the lever 32 by means of a universal joint such as shown in Fig. 3. The lever 32 has a spherical head 35 which fits within the opening in the enlarged end 36. A spring 37 engages the head 35 and is held under compression by means of a plug 38. If we examine Fig. 3, we will find that when the lever 11 is moved rearwardly, the brackets 14 will be moved from the position shown to one more nearly vertical, by means of which the rear end of the frame will be raised. When the lever 11 is moved rearwardly the shaft 9 will be rotated and the arm 33 will move bar 34 forwardly, thereby moving the lever 32 and the front axle 28 in a counter-clockwise direction whereby the front end of the frame is raised. The parts are so proportioned that by the means described the front and the rear ends of the frame will be raised at the same rate which is very important, as by this means the plows will retain their proper inclination. I will now describe the means by which the beets are pulled. Pivoted to the inside of sides 1 and 2 are plow beams 39 and 40 which are alike, except that one is a right and the other a left. These beams are attached to the lower ends of brackets 41 by means of bolts 42. Pivotally attached to each beam is a cylindrical rod 43 which projects through a transverse bar 44. Between the lower side of bar 44 and the shoulder 45 is a compression spring 46 which tends to move the beam downwardly and permits it to yield in an upward direction when subjected to an upwardly directed force. Hooks 46ª are secured to the sides of the frame by means of bolts 47 and serve to limit the downward movement of the plow beams. The rear ends of the beams are curved downwardly and inwardly in the manner shown in Figs. 1 and 3 and have secured to their lower ends plows comprising moldboards 48 and removable points 49. The forward ends of the moldboards 48 are so shaped that they fit into the opening 50 in the plow point so that the latter may be readily removed when dull and replaced by a sharp point. The points 49 are held in place by a bolt passing through the hole 51. For the purpose of cutting the ground on each side of the row of beets, I have provided two colters 52 which are rotatably mounted on the inner and lower ends of brackets 53. These brackets have a vertical portion 54 and are clamped to the sides of the frame by means of a clamping bolt 55.

From the above description, taken in connection with the drawings, it is apparent that I have produced a beet digger that is supported on two pairs of wheels, and which therefore does not require any part thereof to be carried by the horses. The means for adjusting the depth of the plows are so constructed that the inclination of the plows is not altered and the plows are provided with points that can readily be applied and removed. The latter feature is of great importance as the plow shares, especially the points, quickly dull, which requires that the entire plow share be taken off and sent to the blacksmith for sharpening. When my removable points are used, the dull point can be removed and a sharp one substituted therefor in a few minutes, which results in a large saving of time and a decreased expenditure of money.

Having now described my invention, what I claim as new is:

1. A beet harvester comprising an elongated frame, a shaft located near the rear end thereof, said shaft extending across the frame and rotatably connected thereto, a bracket non-rotatably connected to each end of said shaft, the free ends of said brackets being bent into parallel relationship with the shaft and adapted to serve as journals for wheels, a lever non-rotatably connected to the shaft, a notched arcuate member secured to the frame and operatively related to the lever, means on the lever for engaging the notches on the arcuate member, a second shaft rotatably connected with the front end of the frame, said shaft having its ends bent substantially into a position at right angles thereto, the outer portion of said bent ends having their axes in parallel relation with the main portion of the shaft, an arm non-rotatably connected with the first-named shaft, a lever non-rotatably connected with the second-named shaft, and a rigid link connecting the end of said arm and lever whereby the rotation of the first-named shaft will rotate the second shaft, said link having a spring-pressed abutment for engaging the lever.

2. A beet harvester comprising an elongated frame, a shaft located near the rear end thereof, said shaft extending across the frame and rotatably connected thereto, a bracket non-rotatably connected to each end of said shaft, the free ends of said brackets being bent into parallel relationship with the shaft and adapted to serve as journals for wheels, a lever non-rotatably connected to the shaft, a notched arcuate member secured to the frame and operatively related to the lever, means on the lever for engaging the notches on the arcuate member, a second shaft rotatably connected with the front end of the frame, said shaft having its ends bent substantially into a position at right angles thereto, the outer portion of said bent ends having their axes in parallel relation with the main portion of the shaft, an arm non-rotatably connected with the first-named shaft, a lever non-rotatably connected with the second-named shaft, a rigid link connecting the end of said arm and lever whereby the rotation of the first-named shaft will rotate the second shaft, said link having a spring-pressed abutment for engaging the lever, and means for permitting the second-hand shaft to be rotated in the plane of the frame.

3. A beet puller comprising, in combination, a frame, a pair of supporting wheels at each end thereof, means for simultaneously adjusting the vertical relationship of the frame to the wheels, two spaced plows pivotally connected to the frame at a point intermediate the ends thereof, resilient means for moving said plows downwardly, and stops for limiting the downward movement.

In testimony whereof I affix my signature.

JOSEPH CONRAD KECHTER.